Dec. 15, 1925.
C. R. WESTBROOK
1,565,767
VACUUM BRAKE
Filed Dec. 1, 1922
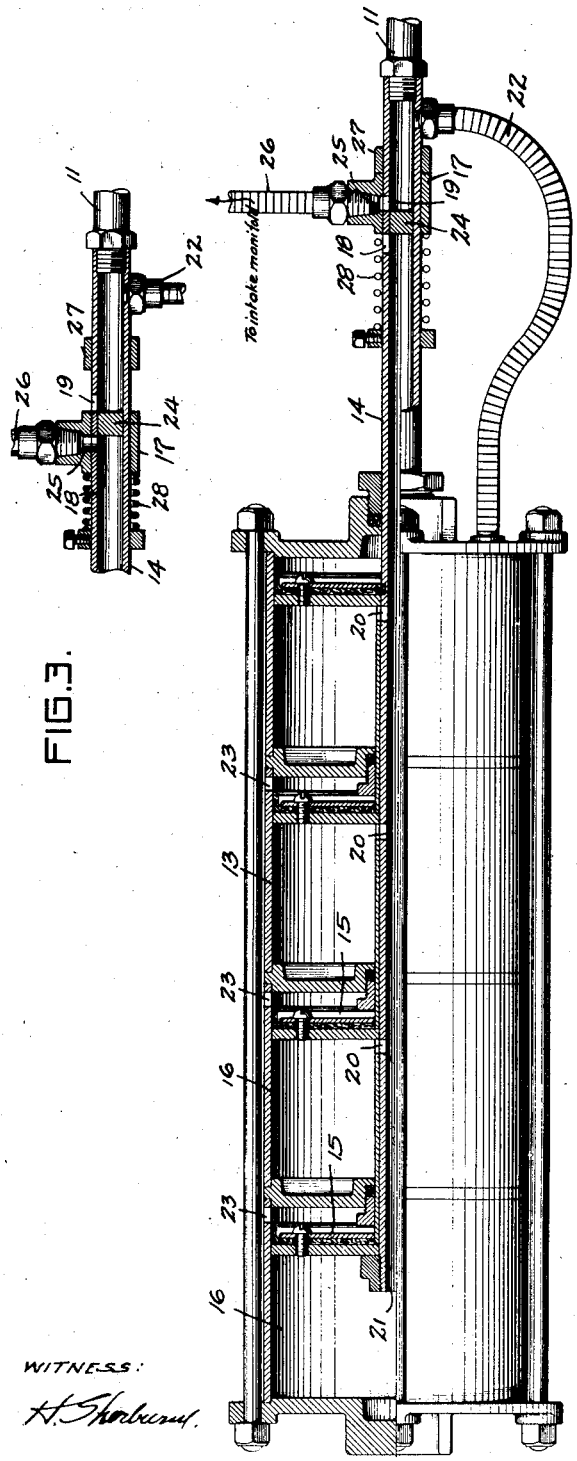
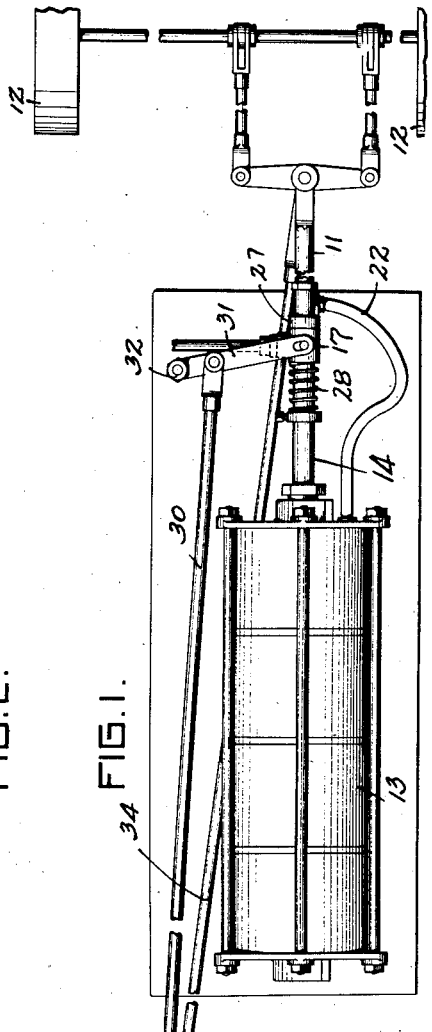
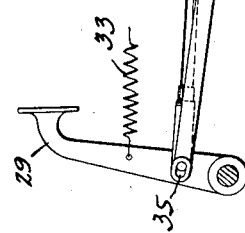
INVENTOR.
Charles R. Westbrook
BY White Frost Evans
his ATTORNEYS.

Patented Dec. 15, 1925.

1,565,767

UNITED STATES PATENT OFFICE.

CHARLES R. WESTBROOK, OF SAN FRANCISCO, CALIFORNIA, ASSIGNOR, BY MESNE ASSIGNMENTS, TO SIMPLEX AIR BRAKE COMPANY, A CORPORATION OF CALIFORNIA.

VACUUM BRAKE.

Application filed December 1, 1922. Serial No. 604,145.

*To all whom it may concern:*

Be it known that I, CHARLES R. WESTBROOK, a citizen of the United States, and a resident of the city and county of San Francisco, in the State of California, have invented a new and useful Vacuum Brake, of which the following is a specification.

The invention relates to a brake mechanism operated by a difference in pressure on opposite sides of one or more pistons. Such a mechanism is especially useful in connection with the operation of automobile brakes, where the difference in pressure may be obtained by connecting one side of the brake cylinder to the intake manifold of the engine. In this manifold there is a suction tending to produce a vacuum, so that the pressure acting on the side of the piston is reduced, and there results a corresponding movement of the piston to set the brakes.

Such a system has been described in an application in my name, entitled "Vacuum brakes" filed October 9, 1922 and having Serial Number 593,392. In that application, an arrangement is disclosed whereby the extent of movement of the brake operating rod may be accurately controlled by a manually operated lever or pedal, and the final position of the brake operating rod depends only upon the position to which the manually operated lever has been moved. The advantages of this system have been fully set forth in the application hereinbefore identified. The brakes however, are arranged to be applied by the vacuum operated cylinder, and the usual spring arrangement or its equivalent is necessary to release the brakes.

The present invention has for one of its objects to eliminate this spring arrangement, and to operate the brakes in either direction by fluid pressure.

It is another object of my invention to provide a fluid pressure system for automobile brakes, in which a brake cylinder is utilized, either side of which may be connected to the intake manifold or other space where a suction or partial vacuum exists.

My invention possesses other advantageous features, some of which, with the foregoing, will be set forth at length in the following description, where I shall outline in full that form of the invention which I have selected for illustration in the drawings accompanying and forming part of the present specification. Although in the drawings I have shown but one embodiment of my invention, it is to be understood that I do not wish to be limited thereto, since the invention as expressed in the claims may be embodied in other forms also.

Referring to the drawings:

Figure 1 is a diagrammatic view of a complete brake operating mechanism, embodying my invention;

Fig. 2 is an enlarged view, partly in section, of the brake cylinder and its valve shown in Fig. 1, with the valve shown in the brake releasing position; and Fig. 3 is an enlarged sectional view of the valve shown in the brake applying position.

As in my prior application, a brake operating rod 11 is shown as applied, either directly or indirectly, to the automobile brakes 12. These brakes are in the present instance shown merely in a diagrammatic manner. The movement of the brake rod 11 to apply and release the brakes 12 is accomplished by the aid of a brake cylinder 13, the piston rod 14 of which is directly or indirectly connected to the rod 11. Although other types of brake cylinders may be used, I prefer a compound cylinder having a plurality of pistons 15 and a plurality of cylinder chambers 16, arranged substantially as described in still another application in my name, entitled "Fluid pressure cylinder," filed October 10, 1922, and having Serial Number 593,607. The advantages of this type of cylinder have been fully set forth in this application, one of them being that no multiplying arrangement need be used for the force exerted by the cylinder; and the rod 14, to which all of the pistons 15 are fastened, may be directly connected to the brake rod 11.

As shown most clearly in Fig. 2, the control of the brake cylinder 13 is effected by the aid of a valve member 17, which is arranged to cooperate with certain ports 18 and 19, movable with the piston rod 14. For the sake of simplicity, the ports 18 and 19 are placed directly in the rod 14, which is made hollow. The arrangement is such that port 18 is in communication with the cylinder chambers 16 on one of the two sides of the pistons 15, as for example on the left of these pistons, by the aid of the apertures 20 in the piston rod 14, and also the aperture 21 extending through the rod. On the other hand, port 19 is adapted to be placed in communication with the other side of one or more of the chambers 16, by the aid of a flexible pipe 22 fastened into the piston rod 14. The valve member 17 is arranged to slide upon the rod 14. Those chambers 16 which are not in communication with pipe 22 have vents 23 communicating with the outside atmosphere. A wall 24 is provided between ports 18 and 19, so that there can be no communication through rod 14 between opposed sides of the cylinder chambers 16.

It is evident that if port 18 be placed in communication with the intake manifold, so that a suction is created through this port, there will be a reduction in pressure on the left of the pistons 15, so that the rod 14 is pulled to the left, and the brakes are applied. This condition is illustrated in Fig. 3, where the valve member 17 has its port 25 alined with port 18, so that there is a connection between port 18 and the intake manifold, by way of the flexible tube 26, which is connected to the valve 17. The port 19 is uncovered to atmosphere, so that the right hand sides of all the chambers 16 have atmospheric pressure, and overpower the pressure acting on the other sides of the pistons.

In order to release the brakes, the valve member 17 is moved relatively to rod 14 so as to occupy the position shown in Fig. 2. In this position port 25 is in communication with port 19, while port 18 is uncovered. Therefore movement of the brake rod 11 is effected to the right, and the brakes are released. It has been found that but one of the cylinder chambers 16 need be connected to pipe 22 to provide the requisite force to release the brakes. A limiting collar 27 is attached to the rod 14 to stop the valve 17 in its movement to the right, and a spring 28 is used to urge the valve to the inactive position shown in Fig. 2. These latter features are substantially identical with those described in my prior applications.

The movement of valve member 17 to effect operation of the brakes may be performed manually, as by the aid of the conventional foot pedal 29 and a link 30 connected to the pedal. This link in turn operates a lever 31 pivoted at a stationary point 32, and at its free end, connected by a slot and pin connection with valve 17. Movement of the pedal 29 forward thus serves to set the brakes 12, and release of the pedal so that it returns to the rear in response to the tension of spring 33, causes the brakes 12 to be released.

The operation of the system to set the brakes at any desired point may now be set forth. Upon movement of valve 17 to the left of the position shown in Fig. 2, so that port 18 will be in communication with port 25 in valve 17, the rod 14 will move to the left, just far enough to maintain communication between these ports. A further movement of the rod cannot result, for then there would be no communication between ports 18 and 25 and the vacuum on the left hand side of chambers 16 could not be maintained. As a matter of fact, the valve ports 18 and 25 are open just enough to maintain this vacuum against inevitable leakage. Upon further movement of pedal 29 forward, the rod 14 follows up, to the same extent. In this way, the position of rod 14 is a function of the position of pedal 29.

Upon releasing pedal 29, so as to cause valve 17 to move to the right, the ports 18 and 25 are placed out of communication, and gradually ports 19 and 25 become alined. When this takes place, rod 14 is pushed by atmospheric pressure to the right, until communication between the ports is almost but not quite interrupted. Thus there is a follow-up action in this direction also, which takes place substantially instantaneously in response to the operation of the pedal 29. The extreme right hand position of valve 17 and of the pistons 15 is illustrated in Fig. 2, where spring 28 serves to urge the valve 17 strongly against stop collar 27.

There may at times be necessity for applying the brakes manually, as for example when the engine is not running, or when for any other reason the fluid brake system is inoperative. For this purpose I provide a rod 34, connecting pedal 29 with the brakes 12 directly. As in my prior application, this rod has a lost motion connection with pedal 29, as indicated at 35. In this way manual operation is not effected until after the pedal 29 has moved far enough to set the fluid pressure system into operation.

I claim:

1. In a vacuum brake system for an engine operated automobile, a cylinder having a plurality of chambers, a piston rod extending into all of the chambers, means connected to the rod for operating the brakes, pistons carried by the rod, one in each chamber, means forming a valve arrangement for connecting one side of each chamber to the intake manifold of the engine, and for alternately connecting only a portion of all of the other sides of the chambers to the intake manifold.

2. In a brake system, a cylinder having a plurality of chambers, a piston rod connected to the brakes for operating them and extending into all of the chambers, means for subjecting those sides of all the chambers that serve to apply the brakes, to a pressure differing from atmospheric, and means for subjecting the other sides of only a portion of all of the chambers to said pressure, the remainder of the chambers being connected to atmosphere.

3. In a vacuum brake system for an engine operated automobile, the engine having an intake manifold in which a partial vacuum is created, a cylinder having a plurality of separate chambers axially displaced, a common hollow piston rod for all of the chambers, pistons carried by the rod, one for each chamber, the hollow space in the rod connecting to one side of each chamber, a valve member slidable on the rod, and serving to control the connection between the intake manifold and the hollow space in the rod, said rod having another separate hollow space also controlled by the valve member to uncover it to atmosphere while the first hollow space is connected to the intake manifold, and vice versa, and means forming a connection from the second hollow space to only a portion of those sides of the cylinders which are out of communication with the first hollow space, the remaining of these sides being permanently connected to atmosphere.

In testimony whereof, I have hereunto set my hand.

CHARLES R. WESTBROOK.